United States Patent
Mesher et al.

(10) Patent No.: US 7,906,462 B2
(45) Date of Patent: Mar. 15, 2011

(54) MUTUAL SOLVENT SYSTEM AND METHOD FOR IMPROVED OIL AND GAS PERMEABILITY IN HIGH TEMPERATURE FORMATIONS

(75) Inventors: Shaun T. Mesher, Calgary (CA); David L. Edwards, Calgary (CA)

(73) Assignee: SynOil Fluids Holdings Inc., Calgary (CA)

( * ) Notice: Subject to any disclaimer, the term of this patent is extended or adjusted under 35 U.S.C. 154(b) by 119 days.

(21) Appl. No.: 12/253,143

(22) Filed: Oct. 16, 2008

(65) Prior Publication Data

US 2010/0099584 A1    Apr. 22, 2010

(30) Foreign Application Priority Data

Jul. 23, 2008  (CA) .................................... 2639030

(51) Int. Cl.
| | |
|---|---|
| C09K 8/72 | (2006.01) |
| C09K 8/68 | (2006.01) |
| E21B 43/16 | (2006.01) |
| E21B 21/00 | (2006.01) |
| E21B 37/00 | (2006.01) |

(52) U.S. Cl. ........ 507/203; 507/260; 507/266; 507/268; 507/277; 166/305.1; 166/307; 166/311; 166/312

(58) Field of Classification Search .................. 507/203, 507/260, 266, 268, 277; 166/305.1, 307, 166/311, 312

See application file for complete search history.

(56) References Cited

U.S. PATENT DOCUMENTS

| | | | |
|---|---|---|---|
| 2,124,530 A |   | 7/1938 | Loomis |
| 4,038,219 A |   | 7/1977 | Boehm |
| 4,220,550 A | * | 9/1980 | Frenier et al. ............... 510/264 |
| 4,498,997 A |   | 2/1985 | Walker |
| 4,737,296 A |   | 4/1988 | Watkins |
| 4,807,703 A |   | 2/1989 | Jennings, Jr. |
| 5,126,059 A | * | 6/1992 | Williamson ............... 507/241 |
| 5,152,907 A |   | 10/1992 | Dulaney |
| 5,366,643 A |   | 11/1994 | Walker |
| 5,441,929 A |   | 8/1995 | Walker |
| 5,674,923 A |   | 10/1997 | Subbaraman |
| 5,697,443 A |   | 12/1997 | Brezinski |
| 6,242,388 B1 |   | 6/2001 | Sharma |
| 6,435,277 B1 |   | 8/2002 | Qu |
| 2003/0078180 A1 |   | 4/2003 | Munoz, Jr. |

FOREIGN PATENT DOCUMENTS

EP    0 384 458 A1    8/1990

OTHER PUBLICATIONS

"Dynol™ 604 Surfactant: A Fluorosurfactant Alternative," Publication No. 120-9855 (Product Information Sheet), Air Products and Chemicals, Inc., Allentown, Penn., as early as 1996, 2 pages.

"How to Formulate with Surfynol® Surfactants," Publication No. 120-9829 (Product Information Sheet) Air Products and Chemicals, Inc., Allentown, Penn., 1998, 2 pages.

"Dynol™ 604 Surfactnat," MSDS No. 300000004711 (Hazardous Materials Sheet), Air Products and Chemicals, Inc., Aug. 18, 2004, 6 pages.

"Surfynol® DF-110D Defoamer," MSDS No. 300000004712 (Hazardous Materials Sheet), Air Products and Chemicals, Inc., Aug. 18, 2004, 6 pages.

"Surfynol® CT-211 Surfactant," MSDS No. 300000004706 (Hazardous Materials Sheet), Air Products and Chemicals, Inc., Aug. 18, 2004, 6 pages.

"Surfynol® CT-221 Surfactant," MSDS No. 30000004707 (Hazardous Materials Sheet), Air Products and Chemicals, Inc., Aug. 18, 2004, 6 pages.

"Surfynol® 2502 Surfactant," MSDS No. 30000004759 (Hazardous Materials Sheet), Air Products and Chemicals, Inc., Aug. 18, 2004, 6 pages.

\* cited by examiner

*Primary Examiner* — Timothy J. Kugel

(74) *Attorney, Agent, or Firm* — Christensen O'Connor Johnson Kindness PLLC

(57) ABSTRACT

A method of acidizing and cleaning up a formation is disclosed, the formation being above 150 degrees C. The formation is treated with a mutual solvent system comprising a mutual solvent of oil and water, an aqueous acid, a corrosion inhibitor, and an iron control agent. In some embodiments, the iron control agent is present in an amount of less than 1% by weight of the mutual solvent system. In some embodiments, the corrosion inhibitor may be present in an amount of less than 10% by weight of the mutual solvent system. In some embodiments, the mutual solvent system further comprises an intensifier.

38 Claims, 1 Drawing Sheet

MUTUAL SOLVENT SYSTEM AND METHOD FOR IMPROVED OIL AND GAS PERMEABILITY IN HIGH TEMPERATURE FORMATIONS

BACKGROUND

Paraffinic and asphaltenic hydrocarbons, as well as calcium carbonate and clays, may form undesirable deposits in boreholes and equipment used for the production of oil and gas from underground formations. The problem of removing such deposits is discussed in U.S. Pat. Nos. 5,152,907 and 6,242,388, and typically involves using an aqueous solution of an acid, such as hydrochloric acid, hydrofluoric acid, acetic acid, and the like, and mixtures thereof, in emulsified combination with a mutual solvent of oil and water.

Acidizing treatments are known to be corrosive, particularly in high temperature formations. In order to reduce corrosion, chemical additives have been used with acidizing treatment mixtures. Examples of typical chemical additives include corrosion inhibitors, intensifiers, acid retarders or emulsifiers, anti-sludge agents, friction-reducers, acid gelling agents, iron control or sequestering agents, mutual solvents, and surfactants. Use of these chemical additives is typically prohibitively expensive, as these additives may be required in high concentration in the acidizing mixture. In addition, a large amount of the corresponding acidizing mixture may be required in order to provide effective treatment. Finally, the effectiveness of traditional acidizing treatments has been limited to use at lower temperatures.

Mutual solvents have been used as chemical additives in acidizing treatments to prevent acid and crude oil emulsions, enhance water-wetting properties, and improve cleanup. In addition, mutual solvents have been used as a pre-flush or an after-flush alone or in combination with brine, acid or the like.

SUMMARY

Therefore, a challenge in the art of acidizing wells exists to provide a solvent system that itself is a mutual solvent and is effective in cleaning wells and production equipment at high formation temperatures. In addition, a challenge also exists to provide such a solvent system in an economical and environmentally friendly format.

A method of acidizing and cleaning up a formation is disclosed, the formation being above 150 degrees C. The formation is treated with a mutual solvent system comprising a mutual solvent of oil and water, an aqueous acid, a corrosion inhibitor, and an iron control agent. In some embodiments, the formation may be above 160 degrees C. In some embodiments, the formation may be above 170 degrees C. In further embodiments, the formation may be above 180 degrees C. In further embodiments, the formation may be above 190 degrees C. In further embodiments, the formation may be above 200 degrees C. In further embodiments, the formation may be above 225 degrees C. In further embodiments, the formation may be above 250 degrees C. In further embodiments, the formation may be above 275 degrees C. In further embodiments, the formation may be above 300 degrees C. In further embodiments, the formation may be above 325 degrees C.

In some embodiments, the iron control agent is present in an amount of less than 1% by weight of the mutual solvent system. In some embodiments, the corrosion inhibitor may be present in an amount of less than 10% by weight of the mutual solvent system.

In some embodiments, the mutual solvent system further comprises an intensifier. In further embodiments, the intensifier is present in an amount of less than 3% by weight of the mutual solvent system.

In some embodiments, the mutual solvent of oil and water comprises a first species and a second species, and a solvent that is water and oil soluble. At least one of the first species and the second species has an alcohol moiety, and at least one of the first species and the second species has an ester moiety. The alcohol moiety is water soluble and the ester is water and oil soluble. In further embodiments, the first species has the alcohol moiety, and the second species has the ester moiety.

In some embodiments, the aqueous acid is present in the amount of at least 5% by weight of the mutual solvent system. In some embodiments, the acid comprises hydrochloric acid.

Further summary is found in the claims, which are incorporated by reference here.

DETAILED DESCRIPTION

Figure 1:
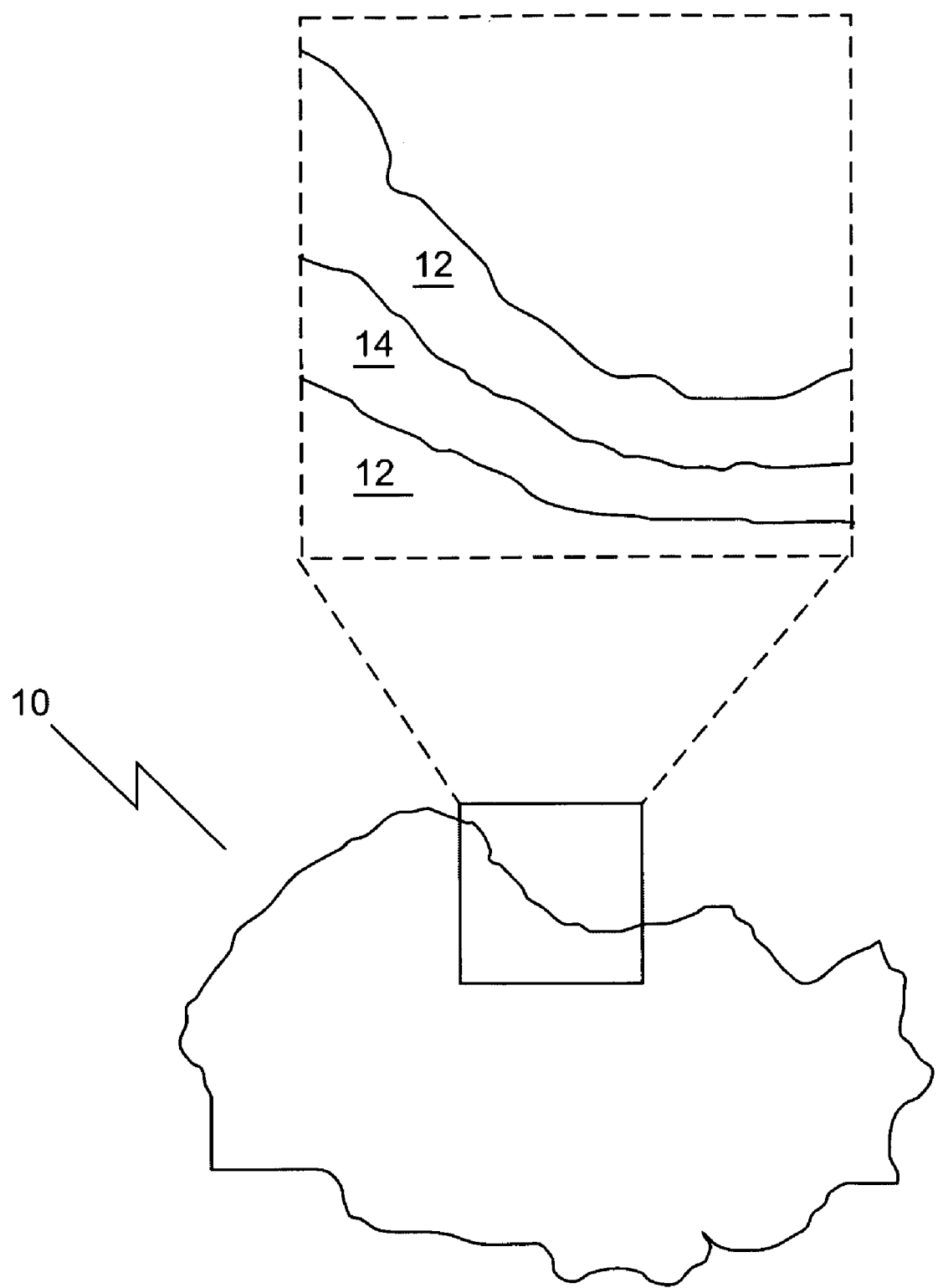
FIG. 1 is an exploded view of a layered scale particle from an oil well.

The term "comprising" is used in its inclusive sense, and does not exclude other components being present. The terms "water soluble" and "oil soluble" mean substantially water and oil soluble respectively. Percentages used herein are weight percent of the total weight of the mutual solvent system unless indicated as otherwise. In use, the mutual solvent system is applied to a well penetrating an earth formation to acidize and clean up the well and earth formation. The application of the mutual solvent system uses any suitable conventional manner of applying an acidizing treatment to a well.

Acidizing treatments may be employed to clean up and improve the permeability of oil and gas wells. Acidizing treatments may be used in, for example, the fracturing or stimulation of carbonate and sandstone-containing formations. Such a treatment may be used to dissolve and remove near-wellbore damage, such as scale build-up or fines. Near-wellbore damage may be caused during any well operation, for example, drilling, cementing, perforating, production, workover, fracturing, and stimulation. Formation damage may include, for example, fines migration, inorganic scale deposition, and/or organic solids deposition, such as paraffin and asphaltenes. The acids may be used to dissolve rock or permeability damaging fines near the wellbore. Acidizing techniques are used for stimulating oil and gas reservoirs to produce at higher rates.

Acidizing treatments are corrosive, particularly in high temperature formations. Uninhibited acid of varying strength will corrode steel, and the amount of acid-induced damage is a function of, for example, contact time, acid strength, and temperature. Corrosion rates for acidizing treatments at 65 degrees C. may be on the order of 1 lb/ft$^2$/day. Corrosion rates may rise exponentially as the formation temperature increases, to a point where conventional acidizing treatments are extremely destructive to wellbore equipment and structure.

Accordingly, a method of acidizing and cleaning up a formation is disclosed, the formation being above 150 degrees C. The formation is treated with a mutual solvent system comprising a mutual solvent of oil and water, an aqueous acid, a corrosion inhibitor, and an iron control agent.

The mutual solvent system may, for example, help to eliminate emulsions and particle plugging. Referring to FIG. 1, a scale particulate 10 is illustrated. The mutual solvent system disclosed herein may remove hydrocarbons from oil-wet scales, which then allows the acid to dissolve any acid soluble materials. In addition, the mutual solvent system may leave the formation water wet. Many scales 10 that form in oil wells are layered. For example, the outside of scale particulate 10 may have a hydrocarbon layer 12 which covers a scale layer 14. A further hydrocarbon layer 12 may be present underneath the scale layer 14, for example. Hydrocarbon layers 12 may prevent a traditional polar solvent or mixture from penetrating to scale layer 14, thereby preventing the dissolution of scale layer 14 in the acid. The mutual solvent system disclosed herein aids in the removal or stripping of oil or hydrocarbon layer 12 which coats scale layer 14 or other deposits, allowing scale layer 14 to be dissolved and removed from the well. This is advantageous, as scale particulate 10 may otherwise prevent or retard the displacement of the acid treatment further into the formation.

In some embodiments, the formation may be above 160 degrees C. In some embodiments, the formation may be above 170 degrees C. In further embodiments, the formation may be above 180 degrees C. In further embodiments, the formation may be above 190 degrees C. In further embodiments, the formation may be above 200 degrees C. In further embodiments, the formation may be above 225 degrees C. In further embodiments, the formation may be above 250 degrees C. In further embodiments, the formation may be above 275 degrees C. In further embodiments, the formation may be above 300 degrees C. In further embodiments, the formation may be above 325 degrees C.

Acid may readily dissolve iron scale in surface equipment, casing and tubing, and may attack iron containing minerals in the formation. The dissolved iron may remain in solution until the acid is spent. As the pH of the spent acid rises above 2, for example, iron loses its solubility and may precipitate. Precipitation of iron compounds from spent acid may cause formation damage and reduce the effectiveness of an acidizing operation. The iron control agent may be used to prevent the precipitation of iron from spent acid fluids. Dissolved iron may precipitate and plug a reservoir. Sources include iron minerals, scale, and rusty tubular goods. Depending on the amount of ferric iron present, a gelatinous mass of precipitate may form and restrict or plug pore throats. Iron control additives may sequester or chelate the iron preventing iron precipitate from forming.

In some embodiments, the iron control agent is present in an amount of less than 1% by weight of the mutual solvent system. In some embodiments, the iron control agent is present in an amount of between 0.45 and 0.65% by weight of the mutual solvent system. The iron control agent may comprise, for example, at least one of a reducing agent, an iron chelator, and an oxygen scavenger.

The corrosion inhibitor may be a chemical that slows down acid corrosion by the formation of, for example, an absorbed barrier layer on a metal surface. Corrosion inhibitors may used in acid treatments to protect, for example, the formation, surface equipment and downhole casing and tubing. Corrosion inhibitors may be used to protect and minimize the damage to metal surfaces and equipment, for example, surface equipment, downhole casing and tubing, and even mineral surfaces in the formation. Acid corrosion inhibitors may work by diffusing from the acidizing solution to the metal surface, and adsorbing or forming a protective film on the metal surface.

In some embodiments, the corrosion inhibitor may be present in an amount of less than 10% by weight of the mutual solvent system. The corrosion inhibitor may comprise, for example, at least one of hexamine, phenylenediamine, dimethylethanolamine, sodium nitrite, cinnamaldehyde, a condensation product of an aldehyde and an amine, an imine, a chromate, a nitrite, a phosphate, hydrazine, a quaternary amine, a quinoline quaternary amine, and ascorbic acid.

In some embodiments, the formation is between 150 and 175 degrees Celsius, and the corrosion inhibitor is present in an amount of between 1.5 and 6% by weight of the mutual solvent system. In some embodiments, the formation is between 175 and 250 degrees Celsius, and the corrosion inhibitor is present in an amount of between 4.5 and 10% by weight of the mutual solvent system.

In some embodiments, the mutual solvent system may further comprise an intensifier. Intensifiers in this document may refer to acid corrosion inhibitors intensifier. Inhibitors may increase the effectiveness of inhibitors at higher temperatures. Intensifiers may be used in combination with corrosion inhibitors to increase the temperature limit for effective protection of wellbore equipment. Intensifiers may cause fast corrosion and coat the steel of the downhole equipment or tubulars.

The intensifier may comprise, for example, at least one of an antimony compound, a metallic iodide salt, and an organic acid. The intensifier may present in, for example, an amount of less than 5% by weight of the mutual solvent system. In some embodiments, the intensifier is present in an amount of less than 3% by weight of the mutual solvent system. In some embodiments, the formation is between 150 and 175 degrees Celsius, and the intensifier is present in an amount of between 0.5 and 2% by weight of the mutual solvent system. In some embodiments, the formation is between 175 and 250 degrees Celsius, and the intensifier is present in an amount of between 1.5 and 3% by weight of the mutual solvent system In some embodiments, the mutual solvent of oil and water comprises a first species and a second species, and a solvent that is water and oil soluble. At least one of the first species and the second species has an alcohol moiety, and at least one of the first species and the second species has an ester moiety. The alcohol moiety is water soluble and the ester is water and oil soluble. In further embodiments, the first species has the alcohol moiety, and the second species has the ester moiety. In this way, variations may be made in order to arrive at the appropriate mutual solvent properties required. The first species may be, for example, a substantially water-soluble alcohol, and the second species may be, for example, a substantially water/oil-soluble ester. The solvent may be, for example, a substantially water/oil-soluble solvent. The alcohol may be, for example, methanol, ethanol, or any mixture thereof.

In some embodiments, at least one of the first species and the second species that has the alcohol moiety is present in the amount of at least 5% by weight of the mutual solvent of oil and water. In some embodiments, the at least one of the first species and the second species that has the alcohol moiety is present in the amount of between 5 and 50% by weight of the mutual solvent of oil and water. In some embodiments, the at least one of the first species and the second species that has the ester moiety is present in the amount of at least 5% by weight of the mutual solvent of oil and water. In some embodiments, the at least one of the first species and the second species that has the ester moiety is present in the amount of between 5 and 50% by weight of the mutual solvent of oil and water. The at least one of the first species and the second species that has the ester moiety may be, for example, a $C_2$-$C_{10}$ ester.

The solvent may be present in the amount of at least 5% by weight of the mutual solvent of oil and water. In some embodiments, the solvent is present in the amount of between 5 and 50% by weight of the mutual solvent system of oil and water. Further, the solvent may comprise a ketone, for example a $C_3$-$C_{10}$ ketone. In some embodiments, the solvent may comprise methyl ethyl ketone. In other embodiments, the solvent may comprise a cyclic ether, for example a $C_3$-$C_{10}$ cyclic ether. In further embodiments, the solvent may comprise tetrahydrofuran. In other embodiments, the solvent may comprise an ether, for example a C2-C10 ether.

In some embodiments, the mutual solvent system further comprises substantially twice the amount of aqueous acid as the mutual solvent of oil and water. In other embodiments, the mutual solvent of oil and water is present in the amount of at least 5-50% by weight of the mutual solvent system. It should be understood that the mutual solvent system may require a sufficient amount of mutual solvent of oil and water in order to function properly.

In some embodiments, the aqueous acid is present in the amount of at least 5% by weight of the mutual solvent system. The aqueous acid may be present in the amount of between 5 and 75% by weight of the mutual solvent system. In further embodiments, the aqueous acid is present in the amount of between 5% and 50% by weight of the mutual solvent system. In other embodiments, the acid is present in the amount of between 0.1% and 50% by weight of the mutual solvent system.

The acid may comprise hydrochloric acid, for example. In other embodiments, the acid comprises at least one of acetic acid, formic acid, and sulfamic acid. The acid may further comprise acetic acid, and the aqueous acid may further comprise at least a 10% acetic acid in water solution. In some embodiments, the acid may comprise, for example, perchloric, chloric, chlorous, hypochlorous, hydrochloric, nitric, sulfuric, nitrous, sulfurous, formic, acetic, carbonic, phosphoric, phosphorous, fluoric, flourous, hydrobromic, hydrobromous, chromic, and sulfonic acid. In general, any acid suitable for forming an aqueous acid and for use in an acidizing treatment may be used.

In some embodiments, the amount of at least one of the corrosion inhibitor and intensifier that is present in the mutual solvent system is selected for use at the temperature of the formation. The formation may be naturally heated over 150 degrees C. or unnaturally heated, for example by a steam assisted gravity drainage operation. The mutual solvent nature of the mutual solvent system requires lower amounts of the additive chemicals than traditional acidizing treatment mixtures, in order to provide a high temperature package. In addition, the mutual solvent system provides an acid package that is useful at even higher temperatures than the traditional systems. In addition, no acid retarders or emulsifiers, anti-sludge agents, friction-reducers, acid gelling agents, mutual solvents, and surfactants are required to be added to the mutual solvent system. The mutual solvent system disclosed herein may be used with producing and injecting wells, for example. The mutual solvent system may further be non-ionic and non-damaging, and not adsorbable to the formation. Further, the mutual solvent system may help to prevent the precipitation of asphaltenes when the acid reacts with acid solubles. The mutual solvent system may be used to increase oil rates in producing wells and increase the injectivity of injection wells.

Embodiments of the method may result in corrosion rates as low as 0.001 lb/ft2/day at 150 degrees C., and as low as 0.01 lbs/ft$^2$/day at 200 degrees C. At 250 degrees C., the corrosion rate may be as low as 0.05 lbs/ft$^2$/day.

An exemplary embodiment of the mutual solvent of oil and water may comprise, for example, 50% methyl ethyl ketone, 18% methyl acetate, and 32% ethanol. Table 1 illustrates various compositions of the mutual solvent system for use at different temperatures.

TABLE 1

Various compositions

| | Temperature | | |
|---|---|---|---|
| | 50 degrees C. | 150 degrees C. | 250 degrees C. |
| Mutual solvent of oil and water | 33 | 32 | 31 |
| Aqueous acid (15% HCl) | 66 | 63 | 60 |
| Corrosion inhibitor | 0.4 | 3 | 6 |
| Intensifier (antimony compound) | 0 | 1 | 2 |
| Iron Control Agent | 0.5-0.6 | 0.5-0.6 | 0.5-0.6 |

The preferred components for the mutual solvent of oil and water may be a water/oil soluble ester, a water-soluble alcohol, and a water/oil-soluble solvent, as for example either or both of a ketone or cyclic ether. The water/oil soluble ester may be methyl acetate, present in the amount of about 5 wt % to 50 wt % of the mutual solvent of oil and water, for example 25 wt % of the mutual solvent of oil and water, and the water-soluble alcohol may be methanol, present in the amount of about 5 wt % to 50 wt % of the mutual solvent of oil and water, for example about 25 wt % of the mutual solvent of oil and water. If a water/oil soluble ketone is used, it may be methyl ethyl ketone (MEK) present in the amount of about 5 to 50 wt % of the mutual solvent of oil and water. The water/oil soluble ester may be methyl acetate present in the amount of about 25 wt % of the mutual solvent of oil and water.

Instead of methyl ethyl ketone, a water/oil soluble cyclic ether may be used, for example tetrahydrofuran from about 5 wt % to about 50 wt % of the mutual solvent of oil and water. A combined amount of the cyclic ether and ketone may be present in the amount of from about 5 wt % to about 50 wt % of the mutual solvent of oil and water.

The water/oil-soluble ketone may be a mixture of $C_3$-$C_{10}$ ketones. The water/oil-soluble ester may be a mixture of $C_2$-$C_{10}$ esters. The water/oil soluble cyclic ether may be a mixture of $C_2$-$C_{10}$ ethers.

The aqueous acid may be present in any amount, as for example from 1 wt % to 90 wt % of the mutual solvent system. The acid itself may be present in the amount of for example 0.1 wt % to 50 wt % of the mutual solvent system and may comprise more than 5% by weight of the mutual solvent system. With 50 wt % hydrochloric acid 15%, the water/oil soluble ester may be methyl acetate present in the amount of 12.5 wt %, the water-soluble alcohol may be methanol present in the amount of about 12.5 wt %, and the water/oil soluble-ketone may be methyl ethyl ketone present in the amount of about 25 wt %. With 67 wt % of the mutual solvent system of a 14 wt % hydrochloric acid in water solution, the water/oil soluble ester may be methyl acetate present in the amount of about 5.5 wt %, the water-soluble alcohol may be methanol present in the amount of about 11 wt %, and the water/oil soluble-ketone may be methyl ethyl ketone present in the amount of about 16.5 wt %.

In another example, the mutual solvent system may comprise about 12.5 wt % methyl acetate, about 12.5 wt % methanol, about 25 wt % methyl ethyl ketone and about 50% wt % hydrochloric acid 15%. The ketone may be replaced by an equal weight of tetrahydrofuran. Other water soluble inorganic and organic acids may be used for the aqueous acid.

The acid itself may be present in the amount of 0.1 wt % to 50 wt % of the mutual solvent system, as for example 5 wt % to 10 wt %, or may be more. With about 6.6 wt % aqueous acetic acid (where the aqueous acid is a 10% acetic acid in water solution), the water/oil soluble ester may be methyl acetate present in the amount of about 5.5 wt %, the water-soluble alcohol may be methanol present in the amount of about 11 wt %, and the water/oil soluble-ketone may be methyl ethyl ketone present in the amount of about 16.5 wt %. Typical water content may be 1 wt % to 90 wt % of the solvent system.

Immaterial modifications may be made what is described here, without departing from what is defined by the claims.

The embodiments of the invention in which an exclusive property or privilege is claimed are defined as follows:

1. A method of acidizing and cleaning up a formation, the formation being above 150 degrees C, the method comprising:
    treating the formation with a mutual solvent system comprising a mutual solvent of oil and water, an aqueous acid, a corrosion inhibitor, and an iron control agent, the mutual solvent of oil and water having one or more species, and a solvent, in which at least one of the one or more species has an alcohol moiety that is water soluble, at least one of the one or more species has an ester moiety that is water and oil soluble, and the solvent is water and oil soluble.

2. The method of claim 1 in which the solvent is present in the amount of at least 5% by weight of the mutual solvent of oil and water.

3. The method of claim 2 in which the solvent is present in the amount of between 5 and 50% by weight of the mutual solvent of oil and water.

4. The method of claim 3 in which the solvent comprises methyl ethyl ketone.

5. The method of claim 1 in which the at least one of the one or more species that has the alcohol moiety is present in the amount of at least 5% by weight of the mutual solvent of oil and water.

6. The method of claim 5 in which the at least one of the one or more species that has the alcohol moiety is present in the amount of between 5 and 50% by weight of the mutual solvent of oil and water.

7. The method of claim 1, in which the at least one of the one or more species that has the ester moiety is present in the amount of at least 5% by weight of the mutual solvent of oil and water.

8. The method of claim 7 in which the at least one of the one or more species that has the ester moiety is present in the amount of between 5 and 50% by weight of the mutual solvent of oil and water.

9. The method of claim 1 in which the solvent comprises a ketone.

10. The method of claim 9 in which the solvent comprises a C3-C10 ketone.

11. The method of claim 1 in which the solvent comprises a cyclic ether.

12. The method of claim 11 in which the solvent comprises a C3-C10 cyclic ether.

13. The method of claim 11 in which the solvent comprises tetrahydrofuran.

14. The method of claim 1 in which the aqueous acid is present in the amount of at least 5% by weight of the mutual solvent system.

15. The method of claim 14 in which the aqueous acid is present in the amount of between 5 and 75% by weight of the mutual solvent system.

16. The method of claim 15 in which the aqueous acid is present in the amount of between 5% and 50% by weight of the mutual solvent system.

17. The method of claim 1 in which the iron control agent is present in an amount of less than 1% by weight of the mutual solvent system.

18. The method of claim 17 in which the iron control agent is present in an amount of between 0.45 and 0.65% by weight of the mutual solvent system.

19. The method of claim 1 in which the mutual solvent system further comprises an intensifier.

20. The method of claim 19 in which the intensifier comprises at least one selected from the group consisting of an antimony compound, a metallic iodide salt, and an organic acid.

21. The method of claim 19 in which the intensifier is present in an amount of less than 5% by weight of the mutual solvent system.

22. The method of claim 19 in which the intensifier is present in an amount of less than 3% by weight of the mutual solvent system.

23. The method of claim 19 in which the formation is between 150 and 175 degrees Celsius, and in which the intensifier is present in an amount of between 0.5 and 2% by weight of the mutual solvent system.

24. The method of claim 19 in which the formation is between 175 and 250 degrees Celsius, and in which the intensifier is present in an amount of between 1.5 and 3% by weight of the mutual solvent system.

25. The method of claim 1 in which the acid comprises at least one selected from the group consisting of acetic acid, and sulfamic acid.

26. The method of claim 25 in which the acid comprises acetic acid and the aqueous acid comprises at least a 10% acetic acid in water solution.

27. The method of claim 1 in which the corrosion inhibitor is present in an amount of less than 10% by weight of the mutual solvent system.

28. The method of claim 1 in which the corrosion inhibitor comprises at least one selected from the group consisting of hexamine, phenylenediamine, dimethylethanolamine, sodium nitrite, cinnamaldehyde, a condensation product of an aldehyde and an amine, an imine, a chromate, a nitrite, a phosphate, hydrazine, a quaternary amine, a quinoline quaternary amine, and ascorbic acid.

29. The method of claim 1 in which the formation is between 150 and 175 degrees Celsius, and in which the corrosion inhibitor is present in an amount of between 1.5 and 6% by weight of the mutual solvent system.

30. The method of claim 1 in which the formation is between 175 and 250 degrees Celsius, and in which the corrosion inhibitor is present in an amount of between 4.5 and 10% by weight of the mutual solvent system.

31. The method of claim 1 in which a first species of the one or more species has the alcohol moiety, and in which a second species of the one or more species has the ester moiety.

32. The method of claim 1 in which the at least one of the one or more species that has the ester moiety is a C2-C10 ester.

33. The method of claim 1 in which the iron control agent comprises at least one selected from the group consisting of a reducing agent, an iron chelator, and an oxygen scavenger.

34. The method of claim 1 in which the mutual solvent system comprises substantially twice the amount of aqueous acid as the mutual solvent of oil and water.

35. The method of claim 1 in which the mutual solvent of oil and water is present in the amount of between 5-50% by weight of the mutual solvent system.

36. The method of claim 1 in which the acid is present in the amount of between 0.1% and 50% by weight of the mutual solvent system.

37. The method of claim 1 in which the acid comprises hydrochloric acid.

38. The method of claim 1 in which the mutual solvent system substantially excludes acid retarders, emulsifiers, anti-sludge agents, friction-reducers, acid gelling agents, and surfactants.

* * * * *